[19] United States Patent
Schwartz

[11] 3,829,791
[45] Aug. 13, 1974

[54] VARIABLE PULSE LASER
[75] Inventor: Jacob Schwartz, Arlington, Mass.
[73] Assignee: Sanders Associates, Inc., Nashua, N.H.
[22] Filed: Sept. 8, 1971
[21] Appl. No.: 178,830

Related U.S. Application Data
[63] Continuation of Ser. No. 847,795, July 23, 1969, abandoned, which is a continuation-in-part of Ser. No. 630,861, April 14, 1967, abandoned.

[52] U.S. Cl............................. 331/94.5, 307/88.3
[51] Int. Cl.............................................. H01s 3/10
[58] Field of Search.................... 331/94.5; 307/88.3

[56] References Cited
UNITED STATES PATENTS
3,388,314   6/1968   Gould.................................. 331/94.5
3,584,312   6/1971   Statz................................... 331/94.5

OTHER PUBLICATIONS
Braunstein et al., Physical Review, 14, (2A), April 20, 1964, pp. 499–507.
Yoshino et al., J. of Applied Physics, 4, April 1965, pp. 312–313.
Midwinter, Brit. J. of Applied Physics, 16, 1965, pp. 1,125–1,133.
Bret et al., Applied Physics Letters, 4, (10), May 15, 1964, pp. 175–176.
Hull, Applied Optics, 5, (8), Aug. 1966, pp. 1,342–1,343.
Statz et al., J. of Applied Physics, 36, (5), May 1965, pp. 1,510–1,514.

Barocchi et Mancini, Physics Letters, 23, (3), Oct. 17, 1966, pp. 230–231.
Barocchi et al., Nuovo Cimento, 18B, (1), March 11, 1967, pp. 159–162.
Berzing et al., Optics & Spectroscopy, xxii, (3), March 1967.
Levine, "Lasers, A Series of Advances," Pub. by Marcel Dekker, Inc., New York, 1966, pp. 1, 29–31.
Siegman, Applied Optics, 1, (6), Nov. 1962, pp. 739–744.
Aleshkevich et al., JETP Letters, Vol. 9, No. 4, Feb. 20 1969, pp. 123–124. Note, also, Ref. No. 2 Cited Therein.

Primary Examiner—Ronald L. Wibert
Assistant Examiner—R. J. Webster
Attorney, Agent, or Firm—Louis Etlinger; Richard I. Seligman

[57] ABSTRACT

A solid state laser having a non linear absorption element inserted in the optical path between the emissive rod and a reflecting surface of the Fabry-Perot cavity. The absorption element is preferably transparent to radiation at the fundamental frequency below a selected threshold. Above the threshold the element increases its absorption as the intensity of the radiation at the fundamental frequency increases. The amplitude, shape and duration of the laser output pulses are controllably variable through adjustment of the pump intensity, rotation of the non linear absorption element and variation of the turn-on time of the laser Q-switch.

4 Claims, 12 Drawing Figures

INVENTOR.
JACOB SCHWARTZ
BY Robert Van Epps
AGENT 3,829,791

VARIABLE PULSE LASER

This is a continuation of application Ser. No. 847,795, filed July 23, 1969, now abandoned, which was a continuation-in-part of my copending application Ser. No. 630,861 entitled "Improved Laser," filed Apr. 14, 1967.

The present invention relates to lasers. More particularly, the invention relates to solid state lasers.

In the prior art solid state lasers of the conventional type utilize typically a xenon flashlamp as an optical pump and a ruby or neodymium glass rod as an emissive element oriented along an optical path between reflecting surfaces of a Fabry-Perot cavity.

For Q-switching, one of the reflecting surfaces may be rotated to inhibit lasing until a desired threshold is obtained. Another device used for Q-switching is a dye solution which bleaches out above a selected radiation intensity and becomes transparent to permit lasing at that level.

The peak power at which such devices can operate is limited in the first instance to a level below which the emissive rod operates coolly and without shattering. Characteristically such lasers are discontinuous in operation and the pump operates at selected intervals, i.e. the laser is pulsed.

In prior art Q-switched lasers, the pulse of radiation is limited in length to from 10 to 200 nanoseconds. The flash which precipitates the pulse extends in duration for approximately 100–4,000 microseconds. The pulse length of a given prior art Q-switching type laser is not variable.

It is therefore an object of the invention to provide an improved solid state laser exhibiting a higher power output.

A further object of the invention is to provide an improved solid state laser which is more efficient.

Still another object of the invention is to provide an improved solid state laser exhibiting variable pulse length.

A still further object of the invention is to provide an improved solid state laser exhibiting longer pulses.

Still another object of the invention is to provide an improved solid state laser having uniform power output.

A still further object of the invention is to provide an improved solid state laser which generates multiple pulses upon injection of a single pulse of enabling energy.

Yet another object of the invention is to provide an improved solid state laser having longer life and requiring less frequent replacement of emissive material.

It is still another object of the present invention to provide a pulsed laser wherein the output pulse amplitude length and shape may be variably controlled.

In accordance with the invention there is provided radiation emission apparatus. The apparatus includes a source of enabling energy. Stimulated emission means are responsive to the enabling energy for producing stimulated emission radiation. Cavity means are coupled to the stimulated emission means for causing the radiation successively to re-enter the stimulated emission means to amplify the radiation. Control means have a medium coupled to the stimulated emission means within the cavity means to control the peak intensity of the radiation to a selected maximum level.

In one form of the invention the apparatus is a laser and the source of enabling energy is an optical pump. The stimulated emission means is a transparent medium formed of a material susceptible of stimulated emission and the cavity means includes a pair of optical reflecting surfaces for reflecting light energy successively through the medium.

In another form of the invention the control means includes a non-linear absorption element traversing the optical path between the medium and the reflecting surfaces.

In still another form of the invention the element is formed of a material which generates a harmonic frequency of the radiation and absorbs the harmonic frequency radiation.

In still another form of the invention the element is adjustable to vary the crystallographic orientation with respect to the light energy from the laser to vary the degree and character of absorption. Here the element is formed of a single crystal material having a selected crystallographic orientation.

In another form of the invention a second amplifier transparent stimulated emission medium is oriented along the optical path and the optical pumping means provide enabling energy in common for the first and second stimulated emission means.

The term "control" as used herein includes but is not limited to:

1. control dynamically achieved by introducing non-linear absorption wherein the absorption rate increases with increasing intensity of incident radiation until the system losses just balance the system gain; and
2. control by saturating a medium through which radiation is transmitted.

Other and further objects of the invention will be apparent from the following description taken in connection with the accompanying drawings, and its scope will be pointed out in the appended claims.

DESCRIPTION AND EXPLANATION OF THE APPARATUS IN FIG. 1

Figure 1:
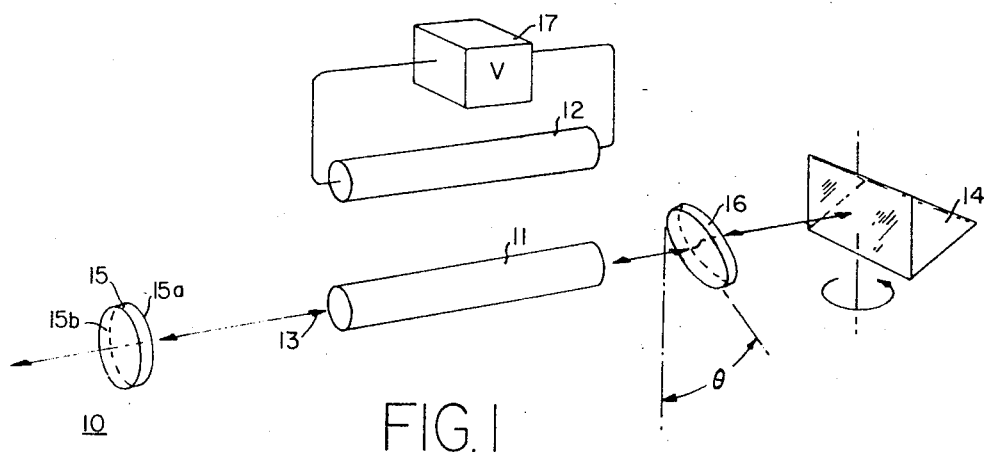
FIG. 1 is a schematic diagram of a laser embodying the invention.

Referring now to the drawings and with particular reference to FIG. 1, there is here illustrated a schematic diagram of a laser apparatus embodying the present invention. While the following description is taken with respect to a laser, it will be apparent that the principles of the invention are applicable for all electromagnetic frequencies wherein stimulated emission is possible. As is well known in the art, the limiting factor on the frequency of operation is the relaxation time associated with the excited states of the emissive material.

Thus, we have here illustrated a laser generally indicated at 10 having an emissive rod 11 which is inherently capable of stimulated emission. The rod 11 may be formed, for example, of ruby or neodymium glass. An optical pump 12 such as a xenon flashlamp provides the enabling energy for stimulated emission in the rod 11. A cylindrical reflector, not shown, surrounds the lamp 12 and rod 11. The rod 11 is disposed along an optical path indicated at 13 in a Fabry-Perot cavity between the reflecting surfaces provided by a prism 14 and a semi-transparent reflecting prism 15. A control element 16 is disposed between the rod 11 and the reflecting surface of the prism 14. The control element is typically a non linear absorption device which increases its absorption rate as the intensity increases tending to hold down the intensity of any given ray. The response time of a control element of this character is less than the duration of the radiation pulses from the laser. Normally, lasing actions tend to take place in the rod in a filamentary fashion so that the resultant beam at the surfaces of the rod consists of a plurality of point sources of light or infrared energy. The term "optical" or "light" as used herein includes, but is not limited to, all wavelengths of light including infrared and ultraviolet. The prism 14 is shown rotatable for Q-switching purposes to develop a higher threshold of operation for the beam.

The control element 16 may be formed, for example, of cadmium sulfide which exhibits the property of non linear absorption, i.e., absorption increases as the intensity increases. The term "second harmonic" as used here includes the so-called two photon absorption effect. The instantaneous appearance of two photons cannot be distinguished from the second harmonic. A discussion of second harmonic generation and two photon absorption may be found in an article entitled "Non Linear Optics" by R. W. Minck, R. W. Terhune and C. C. Wang in APPLIED OPTICS, October, 1966, pages 1595–1612. Note particularly FIGS. 7 10 on pages 1603 and 1604. Thus, any tendency for the laser to produce sharp intense peaks along a filament is eliminated, thereby protecting the rod from hot spots and overheating and consequently, shattering. It is deemed feasible to form the rod 11 of a material which exhibits stimulated emission and which also absorbs energy in a manner required to maintain the intensity of the energy at a reduced level. For cadmium sulfide, the element 16 is oriented at a Brewster angle of approximately 70° to avoid introducing additional Fabry-Perot reflection surfaces to reduce losses in the optical cavity. The Brewster angle is chosen because the light coming from the rod 11 is plane polarized.

Note that the prism 15 may itself be a Fabry-Perot cavity. The reflecting surfaces 15a and 15b provide the cavity and the energy is internally reflected therebetween. Energy from within the prism 15 combines with energy reflectivity of the prism.

The theory of the operation of the laser is well known in the art and well described in the literature particularly in the context of a Fabry-Perot cavity. More particularly, the theory of such a laser is outlined in U.S. Pat. No. 2,929,922 issued to Townes and Schlawlow. The prism 14 is shown rotatable to enable Q-switching and thus to increase the peak power output in the well known manner. The lamp 12 may, for example, be a xenon lamp; the intensity of which is a function of the voltage applied to the lamp. By varying the voltage to the lamp, the intensity may be varied. In the present laser this results in varying the length of the output pulses from 10 nanoseconds to over 2,000 nanoseconds. A variable voltage source 17 is shown coupled to the lamp 12.

In an apparatus built and tested a model No. 1009 laser as manufactured by Applied Lasers, Inc. of Stoneham, Massachusetts was modified to include a control element in the position indicated in FIG. 1. A ruby rod 3 inches long by ¼ inch diameter was used. The Brewster angle chosen was approximately 70°. The control element was formed of cadmium sulfide in an elliptical disc of approximately 18mm × 50mm shaped as shown in FIG. 3. The thickness of the control element determines the degree of absorption which takes place. In the sample tested, the thickness was approximately 5mm. The cadmium sulfide was a single crystal of excellent optical quality. The faces were fabricated parallel to within 2 seconds of arc. The crystallographic C axis was oriented along the major axis of the ellipse A typical frequency of operation 6,943A°. In the apparatus tested the input energy was 800–1,600 joules and the peak output power was approximately $10^6$ watts.

DESCRIPTION AND EXPLANATION OF THE APPARATUS IN FIG. 2.

Figure 2:
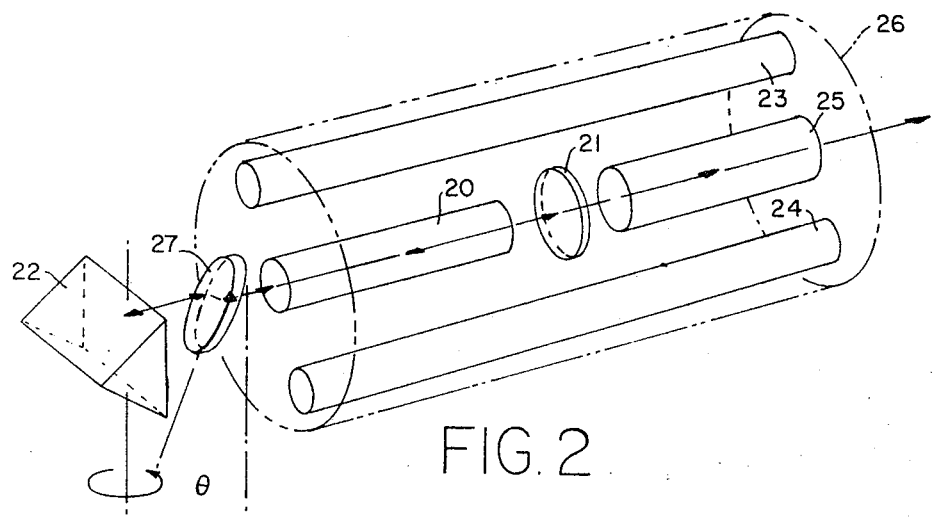
FIG. 2 is a schematic diagram of a modification of the laser in FIG. 1.
Figure 3A:
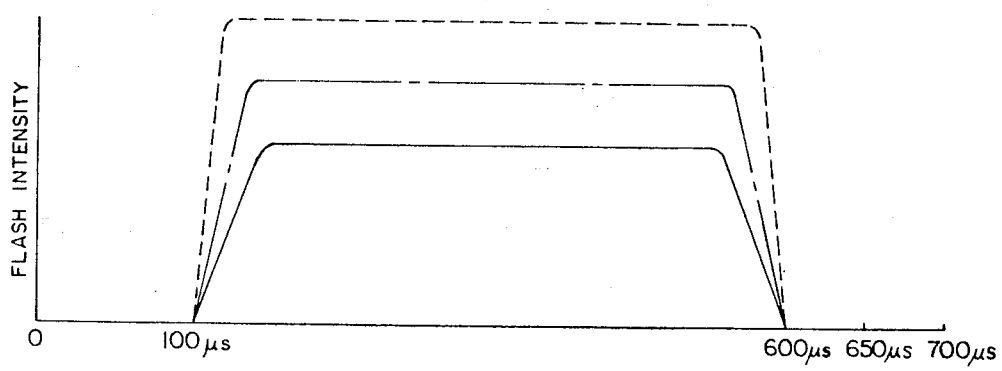
FIGS. 3a – 3e are graphs of a series of curves illustrating the operation of the invention.
Figure 3B:
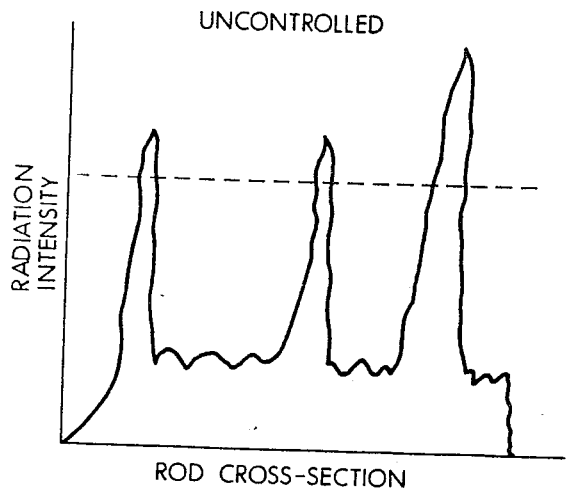
Figure 3C:
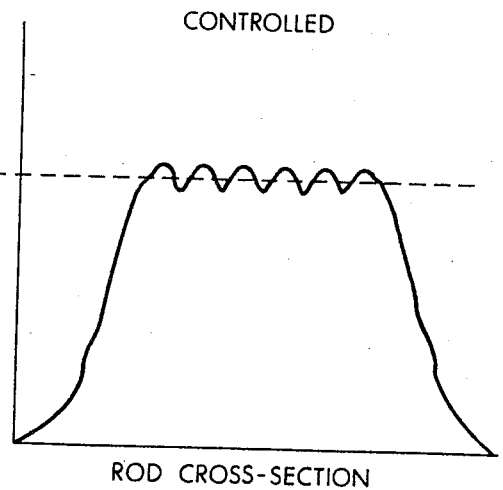
Figure 3D:
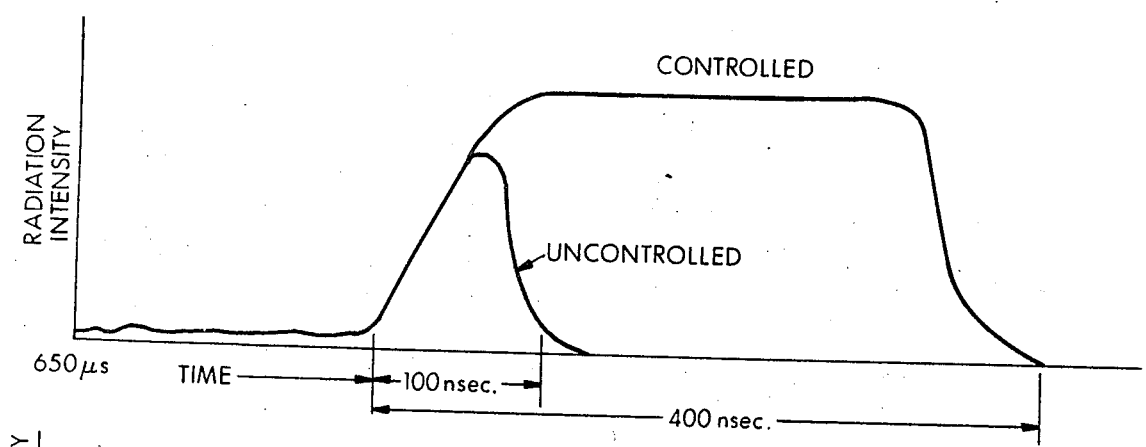
Figure 3E:
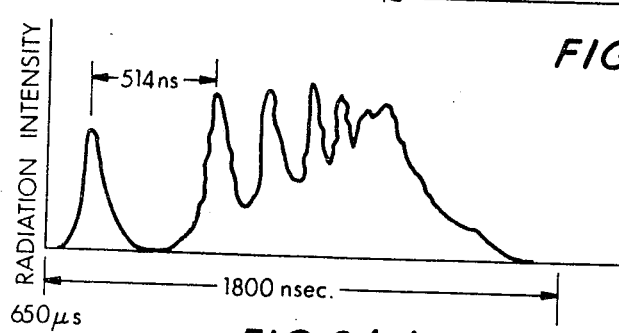

Referring now to FIG. 2 there is here illustrated an oscillator amplifier laser capable of producing high output powers for extremely long pulse duration, e.g., over 2 microseconds. Here the same flash lamp is used to stimulate emission both in the oscillator portion of the laser and the amplifier portion of the laser. Thus, referring now to FIG. 2 an oscillator emissive rod 20 is disposed between a semi-transparent reflecting prism 21 and a Q-switching reflecting prism 22. A pair of flashlamps 23 and 24 illuminate both the oscillator rod and an amplifier rod formed of material exhibiting stimulated emission 25. A reflector 26 surrounds both rods 20 and 25 and is used to optically pump both rods simultaneously. The rod 25 is preferably fashioned of a longer piece of material and larger in diameter to provide a higher power output. Again, a control element 27 is shown disposed between the rod 20 and the reflecting surface of the prism 22. The prism 22 is rotatable as described above for Q-switching purposes.

In the prior art oscillator amplifier, if the same optical pump were used for both rods, the oscillator rod would shatter. Here, however, the pulse length is increased and higher oscillator energies are obtained. The maximum power within the oscillator rod is substantially controlled by the non linear element rather than by the flashlamp intensity.

The laser of the present invention provides a laser having many advantages. More particularly, the average power in time is increased. The average power possible across the cross-section of the rod is increased. The pumping power possible is increased and the overall efficiency of the laser is increased.

By reducing the peak pulses along a filament by using the control element in the manner of the present invention, the average power of a Q-switched laser may be substantially increased. A further advantage is that the laser will more readily operate under degraded conditions. For example, Q-switching takes place over a much wider range from for example, 300 to 1,300 microseconds after the light flash. For a prior art apparatus the Q-switching time for the same light flash conditions must be within 500–550 microseconds. Further by virtue of the ability to increase the pumping energy varying pulse lengths may be obtained with substantially constant amplitude by varying the pumping power.

Referring now to FIG. 3, there is here illustrated a series of curves relating to the operation of a laser embodying the invention. When a ruby rod is stimulated by enabling energy, such as xenon flashlamp, it tends to lase in a filamentary fashion. Given a flash of the characteristic shown by the solid line curve in FIG. 3(a) the radiation intensity varies across the cross-section of the rod as shown, for example, in the curve (b) of FIG. 3. Since a hot spot occurring in a relatively small local area along a peak filament, for example, 1 $mm^2$ can cause the rod to shatter, the peak intensity of the enabling energy is limited to that described by the peak lasing action which takes place along a given filament. By controlling lasing along a given filament to a selected level, the intensity of the enabling energy may be increased, thereby increasing the intensity of lasing throughout the cross-section of the rod as shown in the curve (c) of FIG. 3.

The resultant laser radiation intensity plotted against time in nanoseconds is shown in the curve (d) of FIG. 3. It is apparent that the peak intensity of the uncontrolled curve is below that of the controlled curve and that the pulse length has essentially been stretched from, for example, 100 nanoseconds to 400 nanoseconds in duration. The curve indicative of the controlled case corresponds with the intensity as illustrated by the alternately broken line in the curve (a). The curve (c) of FIG. 3 corresponds with the intensity illustrated by the dashed line in the curve (a). The curve (c) further illustrates the generation of multiple pulses with a single flash of enabling energy.

DESCRIPTION AND EXPLANATION OF THE LASER IN FIG. 4

Figure 4:
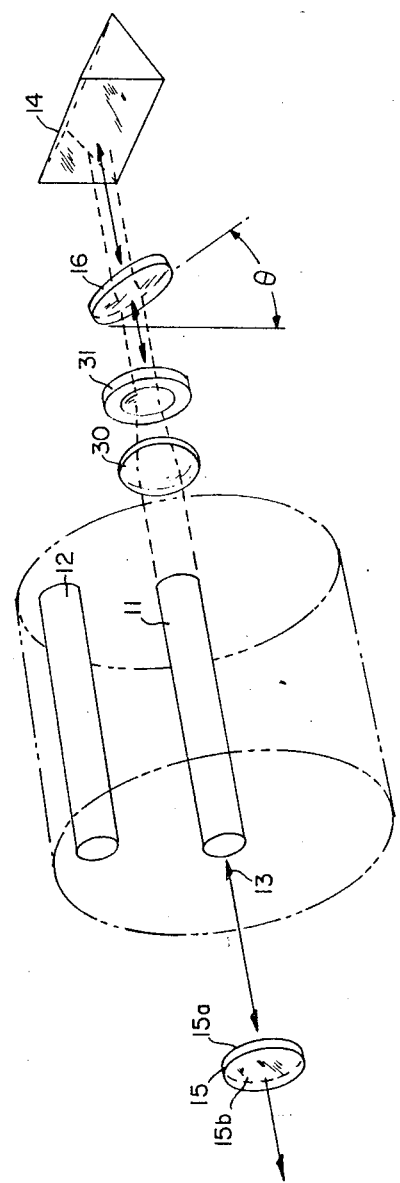
FIG. 4 is a schematic diagram of still another modification of the laser in FIG. 1.

Referring now to FIG. 4, there is here illustrated a modification of the laser in FIG. 1. Here like reference numerals correspond with like parts in FIG. 1.

Here an optical transformer has been added to increase the intensity at the control element 16. The transformer includes a condensing lens 30 and collimating lens 31 to concentrate the energy on the control element 16. In this manner an element with a given threshold controlling action may be used with a wide range of energies. Threshold control may be provided from below 1 watt per $cm^2$ to over $10^{18}$ watts per $cm^2$. The transformer may be reversed to use a divergent lens system which reduces the intensity of radiation at the control element.

From the foregoing discussion it will be apparent that the present invention has broad application to the field of laser technology.

Turning now to that which is not specifically disclosed in the above-referenced parent application it has been found by the Applicant that the output radiation pulses of a Q-switched laser fabricated in accordance with the principles of the present invention may be readily controlled as to amplitude, shape and duration. As the laser is applied to various practical manufacturing problems particularly in the field of microelectronics it becomes apparent that the laser pulse requirements for one operation such as drilling are different from those for another operation such as welding. It has thus become highly desirable to provide a pulsed laser having a controllable output.

Figure 5:
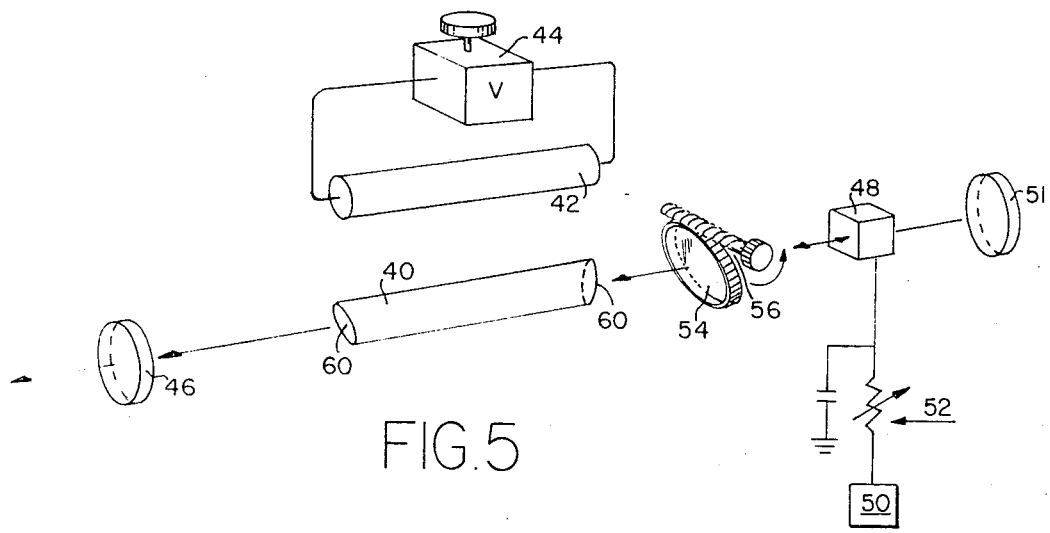
FIG. 5 is a schematic illustration of another embodiment of the present invention.

With reference to FIG. 5 there is illustrated an embodiment of the present invention whereby the laser output pulse shape may be precisely controlled. The active laser element 40 is pumped with energy from a flashlamp 42 which is coupled to a variable voltage supply 44. The resonant cavity is defined by a reflector 46 preferably of the dielectric interference type and a Pockels cell 48 with its associated switching circuitry 50 and mirror 51. The Pockels cell 48 is provided with a variable RC circuit 52 whereby the turn-on time of the Pockels cell may be varied from its normal value of about 5 nanoseconds to hundreds of microseconds. The non-linear absorption cyrstal 54 is provided with a worm and gear assembly 56 such that the crystal 54 may be rotated in its own plane.

Figure 6:
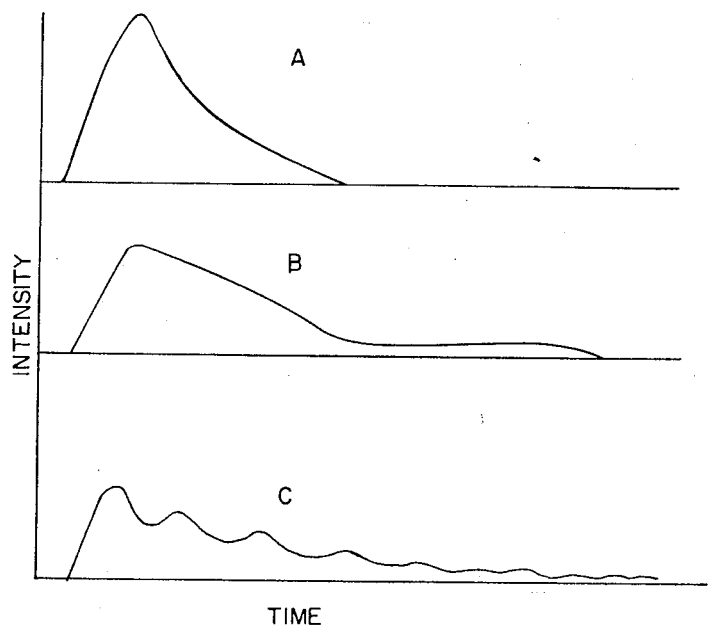
FIGS. 6A through 6C are graphs of the variable pulses achievable through the practice of the present invention.

The radiation 58 emitted by the active laser rod 40 is polarized by the Brewster windows 60 in which the rod ends are formed. When the crystallographic c-axis of the absorption crystal 54 is oriented parallel to the polarization of the radiation from the rod 40 the laser output pulse is characterized by a sharp intensity rise to a maximum value and a relatively long tail of decreasing amplitude as illustrated in FIG. 6A. As the c-axis of the crystal 54 is rotated in its own plane out of coincidence with the direction of polarization the non linear losses within the crystal are varied, the peak pulse amplitude is decreased and the tail or duration of the pulse is increased. The direction of polarization of the laser radiation may be rotated by known techniques and the crystal maintained stationary.

Curves 6B and 6C illustrate this effect and represent radiation pulses obtained by the Applicant with relative rotation of the crystallographic axis of the crystal and radiation polarization of 10° and 45° respectively. It has further been found by the Applicant that when the turn-on time of the Pockels cell 48 is increased by adjusting the RC circuit 52 the length of the laser output pulse is correspondingly increased. As discussed hereinabove the pulse length may also be varied through adjustment of the voltage from source 44 applied to the flashlamp 42.

Thus it will be seen that the output pulses of a laser fabricated in accordance with the present invention may be controlled in three ways; by varying the flashlamp voltage, by providing relative rotation of the non-linear absorption crystal and the radiation polarization and by varying the turn-on time of the Pockels cell Q-switch. The Applicant thus provides a pulsed laser the output of which is both smoothed and controllably variable as to pulse amplitude, shape and duration over a wide range. A single laser may thus be applied to a variety of industrial problems such as drilling, welding and cutting.

While there has hereinbefore been presented what are at present considered to be the preferred embodiments of the invention, it will be apparent to those of ordinary skill in the art that many modifications and changes may be made thereto without departing from the true spirit and scope of the invention.

It will be considered, therefore, that all those changes and modifications which fall fairly within the scope of the invention shall be part of the invention.

What is claimed is:

1. An improved laser, comprising:

a source of enabling energy;

a resonant cavity including a Q-switching means;

an active laser medium disposed within said resonant cavity and responsive to said enabling energy to produce pulses of plane polarized radiation along a path including said laser medium;

a non-linear absorption element disposed in said path within said laser cavity adjacent said laser medium, said non-linear absorption element being a single crystal having a selected crystallographic orientation, having plane parallel faces and disposed with said faces orientated at Brewster's angle relative to said radiation path, said non-linear absorption element formed of a material having an absorption quality which increases with the intensity of radiation incident thereon and controlling the peak intensity of said radiation to a selected maximum level; and means for varying the shape of said radiation pulses comprising means for providing relative rotation between the selected crystallographic orientation of said non-linear absorption element and the direction of plane polarization of said radiation.

2. Apparatus as recited in claim 1 further including means for varying the intensity of said enabling energy to thereby vary the length of said radiation pulses.

3. Apparatus as recited in claim 1 further including an optical transformer disposed in said path between said non-linear absorption means and said active laser medium.

4. Apparatus as recited in claim 1 wherein said Q-switching means is a Pockels cell and further including means for varying the turn-on time of said Pockels cell to thereby vary the shape of said radiation pulses.

* * * * *